US010510063B2

(12) United States Patent
Jeon

(10) Patent No.: US 10,510,063 B2
(45) Date of Patent: Dec. 17, 2019

(54) MOBILE TERMINAL AND METHOD FOR CONTROLLING THE SAME

(71) Applicant: LG ELECTRONICS INC., Seoul (KR)

(72) Inventor: Jaebeom Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 426 days.

(21) Appl. No.: 15/332,274

(22) Filed: Oct. 24, 2016

(65) Prior Publication Data

US 2017/0193489 A1 Jul. 6, 2017

(30) Foreign Application Priority Data

Jan. 6, 2016 (KR) .................... 10-2016-0001700

(51) Int. Cl.
*G06Q 20/32* (2012.01)
*G06F 3/0346* (2013.01)
(Continued)

(52) U.S. Cl.
CPC ......... *G06Q 20/322* (2013.01); *G06F 3/0346* (2013.01); *G06F 3/0416* (2013.01); *G06F 3/0484* (2013.01); *G06F 3/04886* (2013.01); *G06K 9/00087* (2013.01); *G06Q 20/227* (2013.01); *G06Q 20/32* (2013.01); *G06Q 20/3278* (2013.01); *G06Q 20/36* (2013.01);
(Continued)

(58) Field of Classification Search
CPC .... G06Q 20/322; G06Q 20/227; G06Q 20/32; G06Q 20/3278; G06Q 20/36; G06Q 20/40145; G06F 3/0346; G06F 3/0416; G06F 3/0484; G06F 3/04886; G06K 9/00087; H04M 1/7253

USPC ........................................... 705/39
See application file for complete search history.

(56) References Cited

U.S. PATENT DOCUMENTS 9,172,070 B2 * 10/2015 Huang ................ H01M 2/1022
9,454,251 B1 * 9/2016 Guihot .................. G08C 17/02
(Continued)

FOREIGN PATENT DOCUMENTS

KR          20140026263        3/2014
KR          101570354          11/2015
(Continued)

OTHER PUBLICATIONS

Motorola, Inc.: Motorola's Enterprise Mobility Solutions Enable Retailers to Give Consumers Better Shopping Experience, Jan. 2009, Network Weekly News, pp. 1-3. (Year: 2009).*

(Continued)

*Primary Examiner* — Bijendra K Shrestha
(74) *Attorney, Agent, or Firm* — Fish & Richardson P.C.

(57) ABSTRACT

Disclosed are a mobile terminal and a method for controlling the same. The mobile terminal includes a case having a display unit that includes one or more touch regions; one or more payment modules, each of the one or more payment modules including one or more coils; and a controller that is configured to (i) identify a first touch region from the one or more touch regions, wherein the first touch region is a touch region where touch input is applied, (ii) determine a first payment module, from the one or more payment modules, that corresponds to the first touch region, and (iii) connect to the first payment module based on the determination of the first payment module.

20 Claims, 15 Drawing Sheets

(51) Int. Cl.
*G06F 3/041* (2006.01)
*G06F 3/0484* (2013.01)
*G06F 3/0488* (2013.01)
*G06K 9/00* (2006.01)
*H04M 1/725* (2006.01)
*G06Q 20/22* (2012.01)
*G06Q 20/36* (2012.01)
*G06Q 20/40* (2012.01)
*H04B 5/00* (2006.01)

(52) U.S. Cl.
CPC ..... *G06Q 20/40145* (2013.01); *H04B 5/0031* (2013.01); *H04B 5/0081* (2013.01); *H04M 1/7253* (2013.01); *H04B 5/0037* (2013.01); *H04M 2250/04* (2013.01); *H04M 2250/22* (2013.01)

(56) References Cited

U.S. PATENT DOCUMENTS

| | | | |
|---|---|---|---|
| 2013/0021293 A1* | 1/2013 | Nakai | G06F 1/1626 345/174 |
| 2013/0060687 A1 | 3/2013 | Bak et al. | |
| 2013/0159931 A1* | 6/2013 | Lee | G06F 1/1671 715/835 |
| 2013/0169561 A1* | 7/2013 | Park | G06F 3/0488 345/173 |
| 2014/0058941 A1* | 2/2014 | Moon | G06Q 20/322 705/42 |
| 2015/0324766 A1 | 11/2015 | Park et al. | |
| 2016/0026990 A1* | 1/2016 | Rezayee | G06Q 20/20 705/64 |
| 2016/0092877 A1* | 3/2016 | Chew | G06Q 20/4012 705/72 |
| 2016/0274718 A1* | 9/2016 | Burr | G06F 3/0416 |

FOREIGN PATENT DOCUMENTS

| | | | |
|---|---|---|---|
| WO | 20050111882 | 11/2005 | |
| WO | WO-2013144599 A2 * | 10/2013 | ......... G06F 3/0421 |
| WO | 20150020683 | 2/2015 | |
| WO | WO-2015020683 A1 * | 2/2015 | ............. H01Q 7/00 |

OTHER PUBLICATIONS

SyndiGate Media Inc.: PayPal rolls out "One Touch for Web", instant check out service, Apr. 29, 2015, Asian News International, pp. 1-2 (Year: 2015).*

NXP: NFC for embeded applications: Your critical link for the Internet of Things, 2014, pp. 1-20. (Year: 2014).*

International Search Report and Written Opinion in International Application No. PCT/KR2016/012004, dated Jan. 31, 2017, 11 pages (with English translation).

Extended European Search Report in European Application No. 16883963.7, dated Jul. 12, 2019, 9 pages.

* cited by examiner

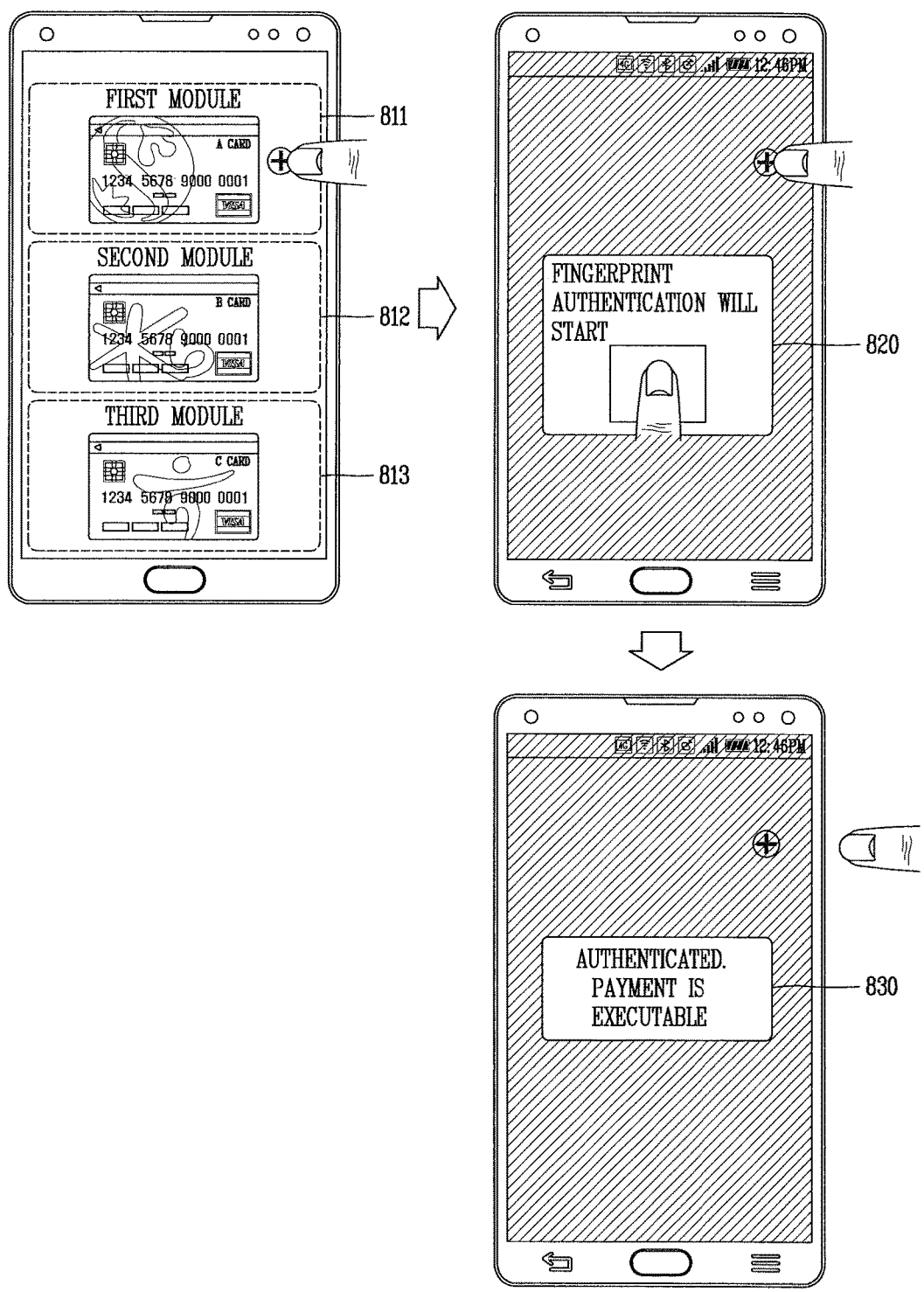

FIG. 11
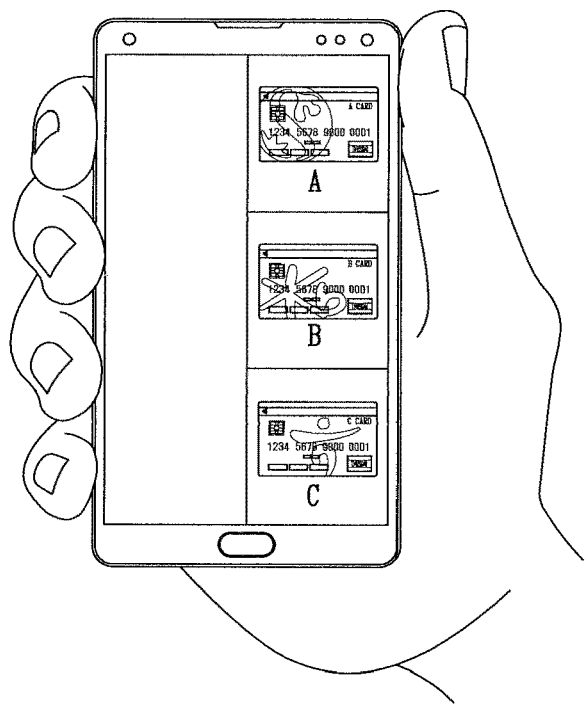
[GRIPPED BY RIGHT HAND]
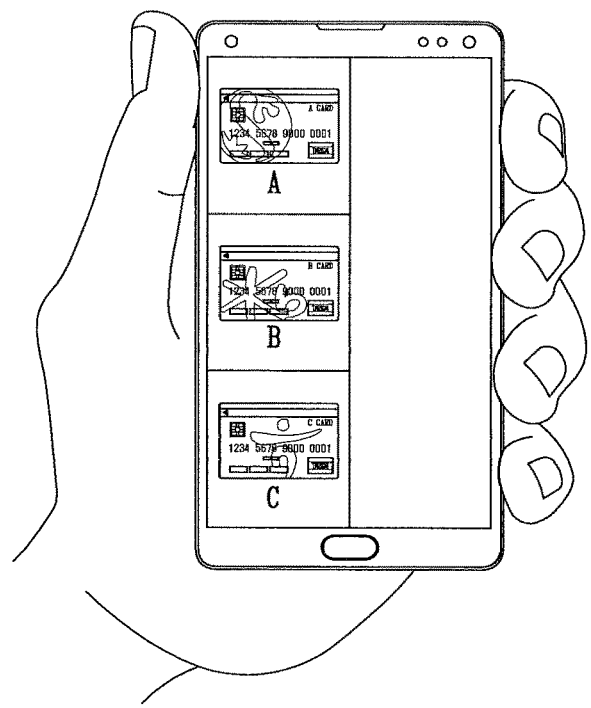
[GRIPPED BY LEFT HAND]

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2016-0001700, filed on Jan. 6, 2016, the contents of which is incorporated by reference herein in its entirety.

BACKGROUND OF THE INVENTION

1. Field of the Invention

The present invention relates to a mobile terminal, and more particularly, to a mobile terminal having a plurality of payment modules therein, and a method for controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions may include data and voice communications, capturing images and video through a camera, recording audio, playing music files through a speaker system, and displaying images and video on a display unit. Some mobile terminals additionally provide functions such as playing an electronic game, or executing a function of multimedia players. Especially, recent mobile terminals may receive multicast signal for providing visual content such as broadcasts, videos, or television programs.

As it becomes multifunctional, a mobile terminal can be allowed to capture still images or moving images, play music or video files, play games, receive broadcast and the like, so as to be implemented as an integrated multimedia player.

The mobile terminal provides various mobile payment services using a short-range communication technique, e.g., a near field communication (NFC) mobile payment module, a magnetic secure transmission (MST) mobile payment module, etc.

In a case where such mobile payment modules are mounted in the mobile terminal, an NFC terminal uses an NFC mobile payment method, and a POS terminal uses an MST mobile payment method. In this case, a user should firstly select a mobile payment method suitable for a payment terminal. For this, a specific application should be executed in order for a user to firstly select a desired payment method. Alternatively, a specific default payment method should be used at ordinary times. This may cause a user's inconvenience.

SUMMARY OF THE INVENTION

Therefore, an aspect of the detailed description is to provide a mobile terminal capable of executing a payment easily and rapidly even when a plurality of payment modules are mounted therein, and a method for controlling the same.

Another aspect of the detailed description is to provide a mobile terminal capable of providing a user customization mobile payment service according to a payment situation, and a method for controlling the same.

To achieve these and other advantages and in accordance with the purpose of this specification, as embodied and broadly described herein, there is provided a mobile terminal, including: a display unit that includes one or more touch regions; one or more payment modules, each of the one or more payment modules including one or more coils; and a controller that is configured to (i) identify a first touch region from the one or more touch regions, wherein the first touch region is a touch region where touch input is applied, (ii) determine a first payment module, from the one or more payment modules, that corresponds to the first touch region, and (iii) connect to the first payment module based on the determination of the first payment module.

In an embodiment, wherein the controller is further configured to: obtain a distance between the mobile terminal and an external terminal, and process, based on the distance between the mobile terminal and the external terminal, a payment transaction with a first payment account that is associated with the first payment module.

In an embodiment, wherein the controller is further configured to: determine whether the touch input applied to the first touch region is being maintained, and stop, based on a determination that the touch input applied to the touch region is being maintained, the payment transaction.

In an embodiment, wherein the controller is further configured to: obtain a distance between the mobile terminal and an external terminal, determine whether the touch input applied to the touch region is released, provide, to the display unit, an image that is associated with a first payment account, and process, based on (i) the distance between the mobile terminal and the external terminal and (ii) the determination that the touch input applied to the touch region is released, a payment transaction with the first payment account that is associated with the image.

In an embodiment, wherein a size, position, or shape of each touch region is adjustable.

In an embodiment, wherein the one or more touch regions includes a second touch region that is different than the first touch region, the second touch region including a plurality of sub-regions, each sub-region being associated with a specific category of payment transaction, and wherein the controller is configured to: identify a second sub-region, from the plurality of sub-regions, that is a sub-region where second touch input is applied, obtain a second category of payment transaction that is associated with the second sub-region, determine a second payment module, from the one or more payment modules, that corresponds to the second sub-region, the second payment module being different than the first payment module, and connect to the second payment module for a payment transaction that is in the second category of payment transaction.

In an embodiment, wherein the first payment module is associated with a plurality of payment accounts and the controller is configured to: provide, in response to the touch input applied to the first touch region, a plurality of additional touch regions to the display unit, wherein each of the plurality of additional touch regions is associated with one of the plurality of payment accounts, identify a second touch region from the plurality of additional touch regions, wherein the second touch region is a touch region where second touch input is applied, and process a payment transaction with a second payment account that is associated with the second touch region.

In an embodiment, wherein the controller is configured to: obtain a distance between the mobile terminal and an external terminal, and provide, based on the distance between the mobile terminal and the external terminal, guide information indicating that a payment transaction is set to be processed with a first payment account that is associated with the first payment module.

In an embodiment, the mobile terminal further comprising a sensor configured to sense tilt of the display unit, wherein the controller is configured to adjust, based on the tilt of the display unit, an arrangement of the one or more touch regions.

In an embodiment, wherein the controller is further configured to provide, to the display unit, guide information indicating the adjustment of the arrangement of the one or more touch regions.

In an embodiment, wherein the first payment module is associated with a plurality of payment accounts and the controller is further configured to: obtain touch sensitivity or touch time duration of the touch input, determine, based on the touch sensitivity or the touch time duration of the touch input, a first payment account from the plurality of payment accounts, and process a payment transaction with the first payment account.

In an embodiment, wherein the first payment module is associated with a plurality of payment accounts and the controller is further configured to: identify a plurality of second touch regions that are touch regions where a plurality of second touch inputs are applied, and determine one or more payment accounts, from the plurality of payment accounts, that are associated with the plurality of second touch regions.

In an embodiment, wherein the controller is further configured to: receive fingerprint information from a user, and determine, based on the fingerprint information, a first payment account that is associated with the first payment module.

In an embodiment, wherein the controller is further configured to: determine whether the touch input is applied within a first distance from boundaries of the first touch region, and provide, to the display unit and based on the determination that the touch input is applied within the first distance from the boundaries of the first touch region, a notification indicating that the touch input is not valid.

In an embodiment, wherein the controller is configured to adjust, based on time information, an arrangement of the one or more touch regions.

In an embodiment, wherein the controller is configured to: identify edge touch input that is applied to edge areas of the display unit, determine, based on the edge touch input, a grip state and a grip position of the mobile terminal, and adjust, based on the grip state and the grip position, an arrangement of the one or more touch regions.

In an embodiment, further comprising: a case including the display unit that is mounted on a first surface of the case; and a battery that is mounted in the case and that is disposed on a second surface of the case, wherein the one or more payment modules are disposed between the case and the battery.

In an embodiment, wherein each of the one or more touch regions is mapped to one of the one or more payment modules.

In an embodiment, wherein the controller is configured to: receive user input in response to the guide information, and stop the payment transaction based on the user input.

In an embodiment, wherein the controller is further configured to: obtain user location information, and adjust, based on the user location information, an arrangement of the one or more touch regions.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 6A to 11 are conceptual views illustrating various embodiments to select a payment method based on a touch region to which a touch input has been applied, in a mobile terminal according to the present invention.

DETAILED DESCRIPTION OF THE INVENTION

Figure 1A:
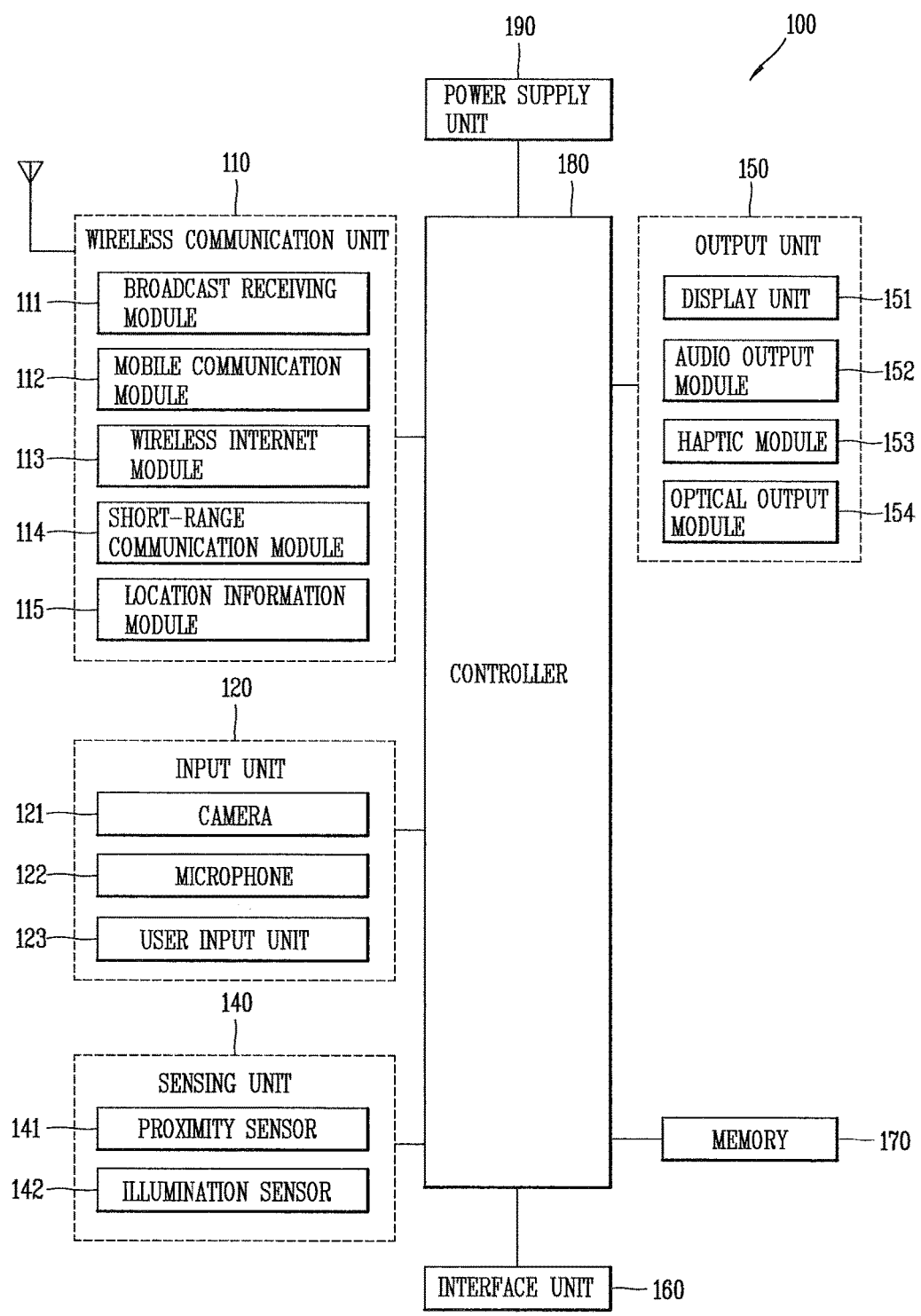
FIG. 1A is a block diagram of a mobile terminal according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart glasses), head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and a digital signage.

Figure 1B:
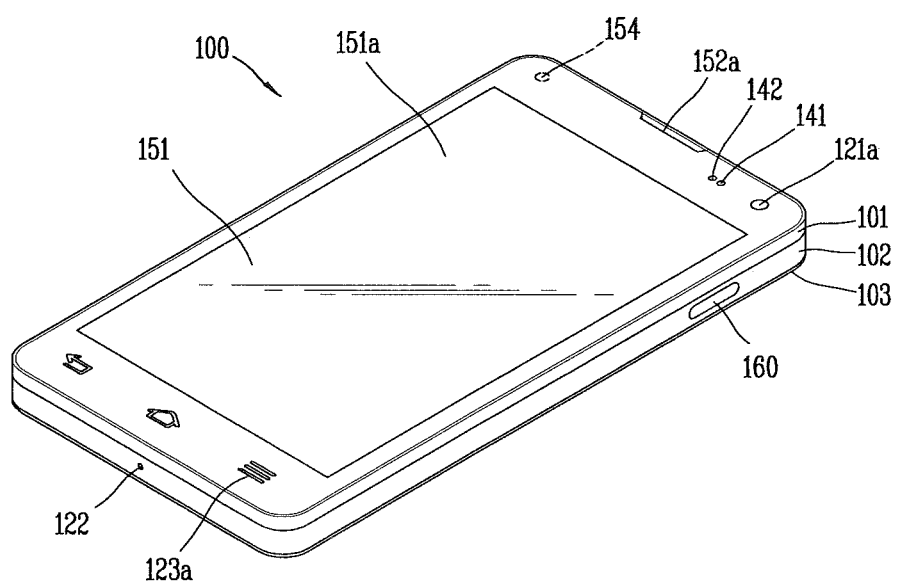
FIGS. 1B and 1C are conceptual views of one example of the mobile terminal according to the present invention, which are viewed from different directions.
Figure 1C:
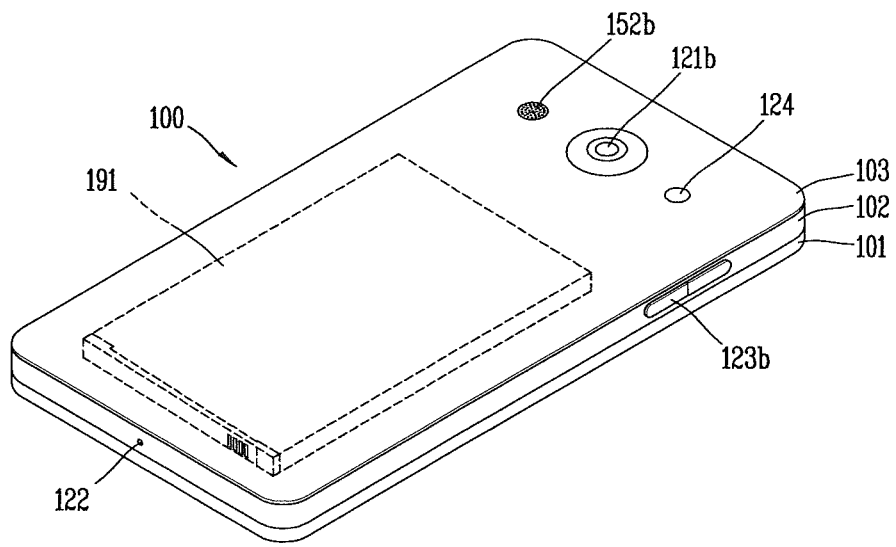

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

Figure 10:
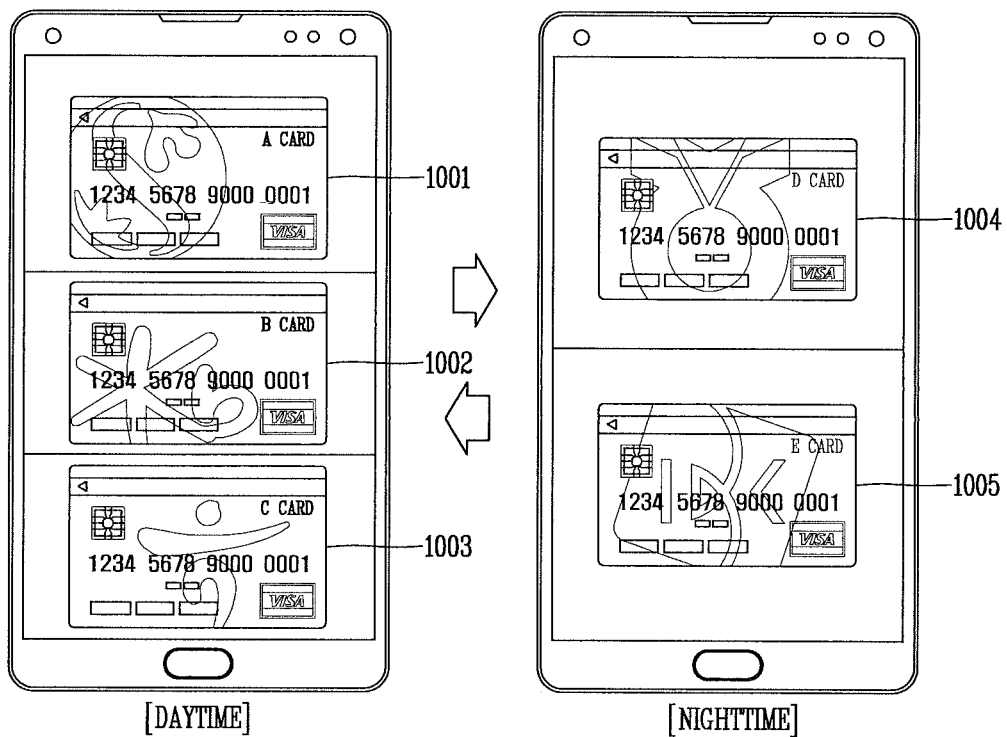

FIGS. 1B and 10 depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

A third camera 121c may be further provided on a front surface of the terminal body. In this case, the third camera 121c may be disposed near the first camera 121a, or near the opposite side to the first camera 121a (i.e., the optical output unit 154).

The third camera 121c may be provided with a wide angle lens. In this case, the third camera 121c may support a wider viewing angle than the first camera 121a. In a general angle mode, the first camera 121a may be activated for capturing. And in a wide angle mode, the third camera 121c may be activated for capturing. An image captured by the third camera 121c may include a larger number of subjects than an image captured by the first camera 121a. However, in this case, distortion occurs toward a peripheral part of a frame.

The third camera 121c may be activated together with or independently from the first camera 121a when the first camera 121a is activated. If the third camera 121c is activated together when the second camera 121b formed on a rear surface of the terminal body is activated, an image captured by the third camera 121c may be used to compensate for a white balance reference value of an image captured by the first camera 121a.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1O, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2A:
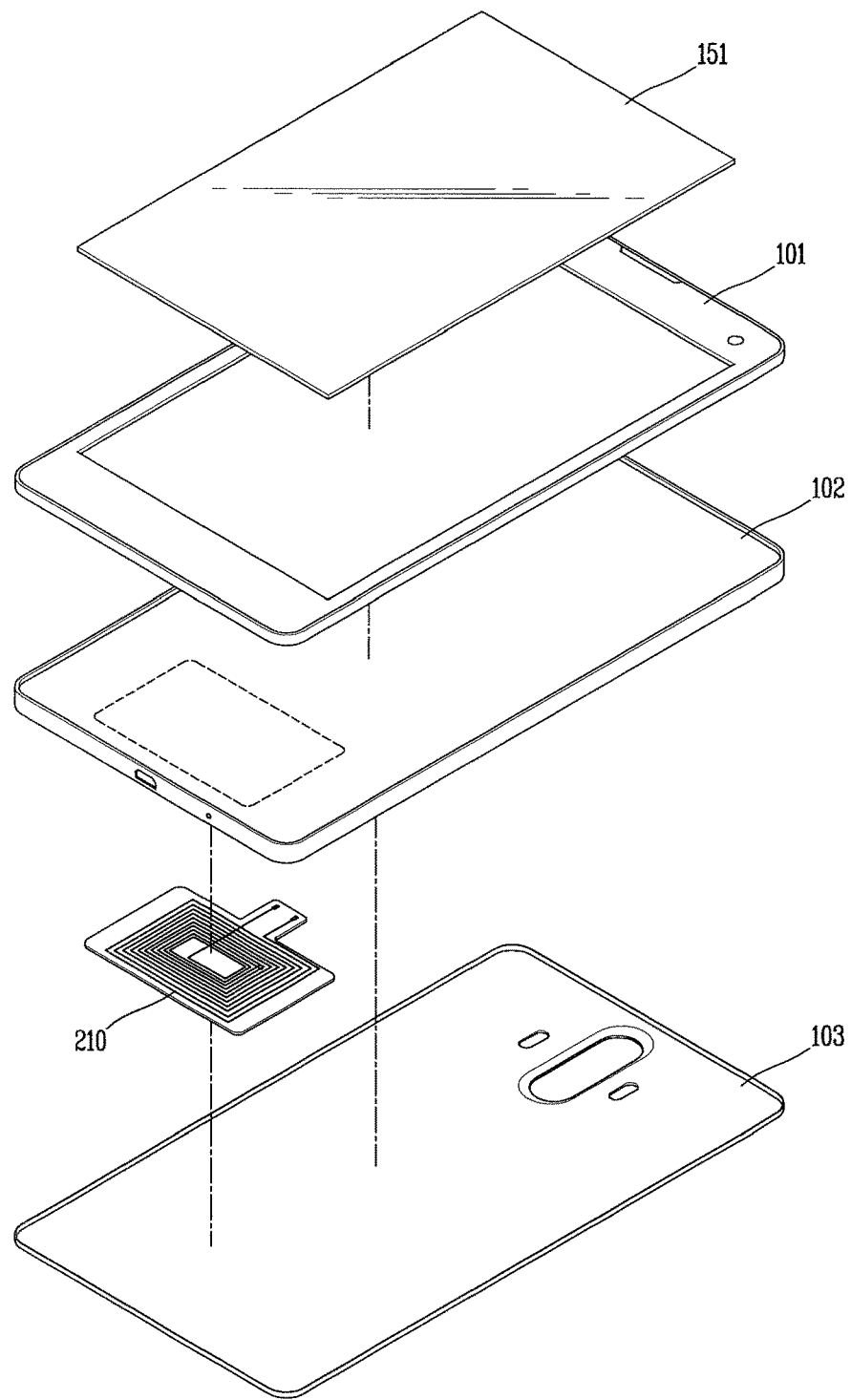
FIG. 2A is a perspective view illustrating a separated state of covers in a mobile terminal according to the present invention.

FIG. 2A is a perspective view illustrating a separated state of the front case 101 and the rear cover 103 in the mobile terminal 100 according to the present invention.

As shown, the rear cover 103 or the front cover 101 may be provided with the display unit 151 on a front surface thereof. Although not shown, the battery 191 may be mounted in the rear cover 103. In this case, a plurality of payment modules 210 may be mounted between the rear cover 103 and the battery 191.

The plurality of payment modules 210 may be electrically connected to the controller 180. Accordingly, a frequency which can be transmitted or received may be matched with the plurality of payment modules 210 by a circuit module provided at the controller 180.

The plurality of payment modules 210 are used to execute a payment by wirelessly communicating with an external terminal (not shown) positioned at a short distance. And the plurality of payment modules 210 may include a terminal (not shown) exposed to the outside.

The plurality of payment modules 210 may be positioned on a front surface or a rear surface of the mobile terminal 100, in order to obtain a wide area for reception of radio waves, and in order to minimize interference with other electronic components. And a magnetic material (e.g., a magnetic sheet) may be provided between the battery 191 and the plurality of payment modules 210, in order to prevent interference between various types of components mounted in the mobile terminal 100 and the plurality of payment modules 210, or in order to enhance wireless communication efficiency.

As shown in FIG. 2A, the plurality of payment modules 210 may be an antenna module formed of coils. Alternatively, as shown in FIG. 2C, the plurality of payment modules 210 may be a plurality of antenna modules formed of coils.

FIG. 2A illustrates coils corresponding to the plurality of payment modules 210. Substantially, the plurality of payment modules 210 may include therein coils having different number of windings and/or different thicknesses. For instance, among coils corresponding to the plurality of payment modules 210, a first coil (not shown) may be used as an NFC antenna and a second coil (not shown) may be used for wireless payment. In this case, the plurality of payment modules 210 may be switched so as to be electrically connected to one of the first coil and the second coil, based on a signal received from the controller 180.

Figure 2B:
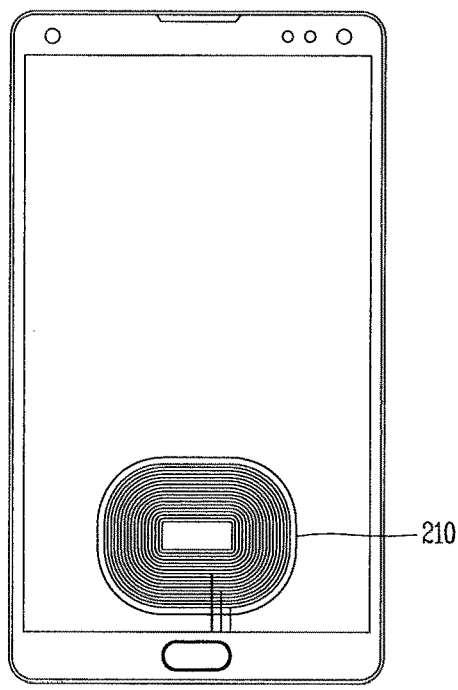
FIGS. 2B and 2C are views illustrating examples of a payment antenna module in a mobile terminal according to the present invention.
Figure 2C:
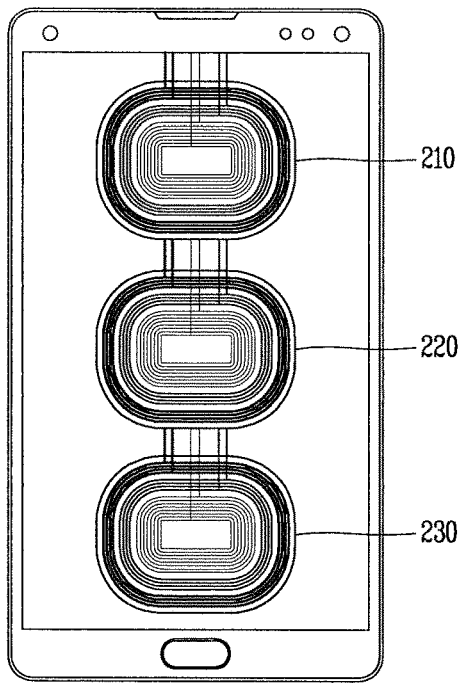

FIGS. 2B and 2C are views illustrating examples of a payment module in the mobile terminal according to the present invention.

Referring to FIG. 2B, the plurality of payment modules 210 may include spiral coils. The spiral coils may include a first coil (not shown) positioned at an outermost side, a third coil (not shown) positioned at an innermost side, and a second coil (not shown) positioned between the first coil and the third coil. In this case, the first to third coils may be connected to frequency matching circuits disposed at the controller 180. Each of the frequency matching circuits includes a capacitor and a resistance.

In the present invention, as to be explained later, a frequency matching circuit corresponding to each coil may be changed such that a plurality of payment modules and a plurality of payment means corresponding thereto may be used based on a touch input. That is, a plurality of switching means may be provided between the frequency matching circuits disposed at the controller 180 and the coils, such that the first coil may be connected to the first frequency matching circuit or the first coil may be connected to the second frequency matching circuit.

Referring to FIG. 2C, each of a plurality of payment modules 210, 220, 230 may be composed of a plurality of coils. In this case, each coil may be wound with a different number of times, and may have a different thickness and a different diameter. As aforementioned, each coil may include a first coil, a second coil and a third coil.

For instance, coils corresponding to the first payment module 210 may be used only as a near field communication (NFC) antenna operated in a card mode, and coils corresponding to the second payment module 220 may be used only as an NFC antenna operated in a P2P mode. And coils corresponding to the third payment module 230 may be used only as an antenna for executing a wireless payment function.

In a case where coils corresponding to a payment module are used as an NFC antenna, the coils correspond to an NFC module which supports a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e.g., a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

In a case where coils corresponding to a payment module are used as an antenna for executing a wireless payment function, identification information related to a payment means (e.g., a QR code, a bar code, etc.) may be output to the display unit 151 such that a POS terminal may read information on a payment means corresponding to the selected payment module.

The arrangement order of the plurality of payment modules 210, 220, 230 shown in FIG. 2C may be changeable. And frequency matching circuits corresponding to the plurality of payment modules 210, 220, 230 may be also changeable as aforementioned.

Coordinates values of a touch point on the display unit 151 where a touch input has been applied, may not match the substantial position of the plurality of payment modules 210, 220, 230. This will be explained in more detail.

The mobile terminal 100 according to the present invention, which includes at least one of the aforementioned components, may include a case having the display unit 151 on a front surface thereof. And the mobile terminal 100 may further include the battery 191 mounted on a rear surface of the case (the battery 191 may be disposed between the plurality of payment modules 210 and the front case 101 in FIG. 2A). And the mobile terminal may include a plurality of payment modules including one or more coils and disposed between the case and the battery.

The controller 180 may recognize a touch region on the display unit 151 to which a touch input has been applied. The touch region includes a touch point on the display unit 151 to which a touch input has been applied, and may be one of a plurality of preset touch regions. The touch region may be recognizable even in a deactivated state of the display unit 151.

Once the touch region is recognized, the controller 180 may selectively connect one of the plurality of payment modules 210 or 210, 220, 230 thereto, the one matching the recognized touch region.

More specifically, if a single coil corresponds to the plurality of payment modules 210 as shown in FIG. 2A or 2B, a sub coil (the aforementioned first, second or third coil) included in the single coil and matching the touch region may be selectively connected to a corresponding frequency matching circuit positioned at the controller 180. For this, frequency matching circuits corresponding to a plurality of sub coils may be preset. That is, a payment module matching a touch region may be preset.

In this case, a payment module matching a touch region may be unrelated to a position of coils corresponding to the plurality of payment modules 210. Especially, if a plurality of coils correspond to the plurality of payment modules 210 as shown in FIG. 2C, a payment module matching a touch region may not correspond to the position of the coils. For instance, in a case where coils corresponding to the second payment module 220 are set to be used as a near field communication (NFC) antenna operated in a P2P mode, even if a touch input is applied to a region where the coils corresponding to the second payment module 220 are positioned (i.e., a central region of the display unit 151), the controller 180 may control the first payment module 210 or the third payment module 230 to be connected thereto.

The controller 180 may change a payment module matching a touch region, or may change a size and/or a position of a touch region matching a payment module, based on setting information. The setting information may be changed by a user input, or may be changed when a preset condition is satisfied.

Figure 3:
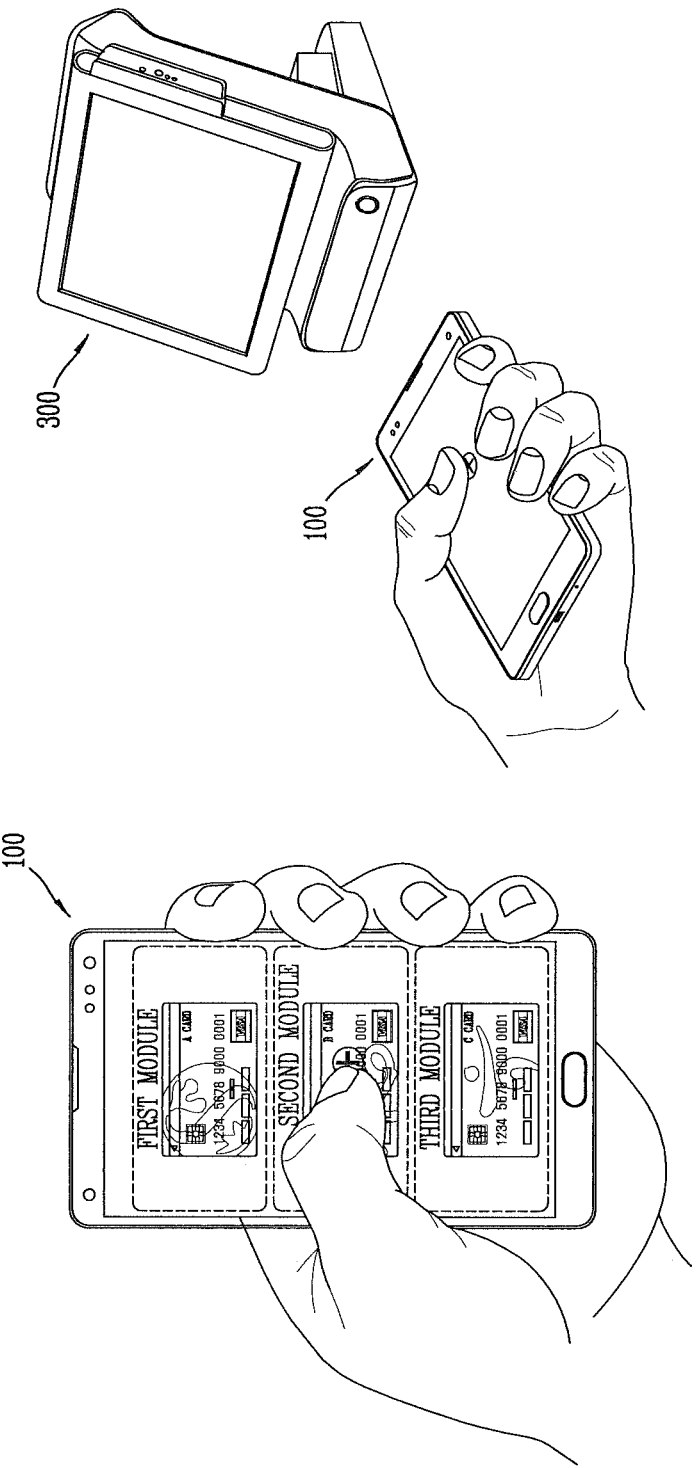
FIGS. 3 and 4 are views illustrating a payment method using a mobile terminal according to the present invention.
Figure 4:
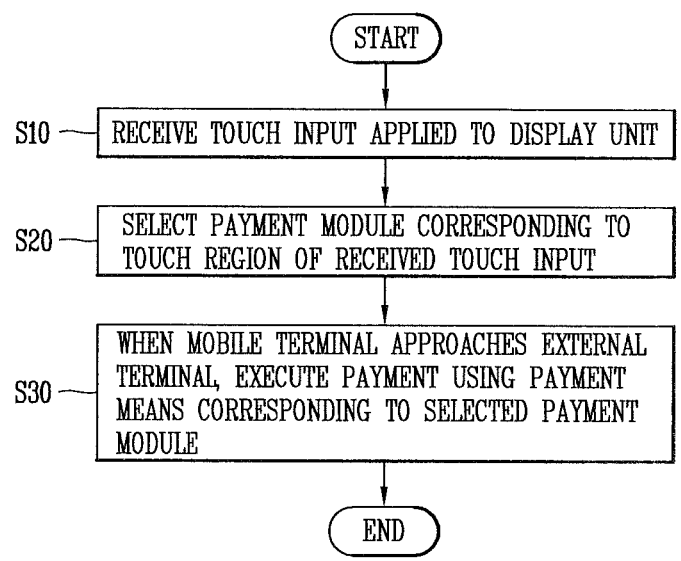

FIGS. 3 and 4 are views illustrating a payment method using the mobile terminal according to the present invention.

Referring to FIG. 3, a plurality of touch regions matching a plurality of payment modules may be set as 3 touch regions obtained by dividing an entire region of the display unit 151 into 3 same-sized touch regions in a vertical direction. However, this is merely exemplary. That is, a larger or smaller number of touch regions may be set, or a plurality of touch regions may have different sizes.

For instance, among the 3 same-sized touch regions of the display unit 151, the upper touch region may match a first payment module and the lower touch region may match a third payment module. And the middle touch region between the upper and lower touch regions may match a second payment module.

In a deactivated state of the display unit 151, if a touch input is applied to the middle touch region matching the second payment module, the controller 180 connects coils corresponding to the second payment module with a frequency matching circuit. For instance, if the second payment module is an NFC antenna operated in a P2P mode, an NFC function executed in the P2P mode is selectively activated in response to the touch input. In this case, an NFC function or a wireless payment function, which is executed in an operation mode corresponding to other payment module (e.g., a card mode) is maintained in a deactivated state.

In this state, upon sensing of approaching of the mobile terminal 100 to an NFC terminal 300, the controller 180 controls a payment to be executed by using a payment means corresponding to the second payment module. The payment means corresponding to the second payment module may be preset, or may be detected from the mobile terminal 100 when the second payment module is connected to the controller 180. For instance, in a case where an NFC function executed in a P2P mode is activated, a point saving card pre-stored in the mobile terminal 100 may be detected. The card detection means that card information stored in the mobile terminal 100 is read for reading or writing of tags through NFC communication between the NFC terminal 300 and the mobile terminal 100.

The payment means corresponding to a payment module is one or more payment means connected to the selected payment module. And the payment means includes various types of payment means using accounts of financial institutions stored in the mobile terminal 100, debit cards, check cards, credit cards, mobile terminals, gift certificates (vouchers), coupons and other social payment services.

The aforementioned NFC terminal 300 is merely for explanations. That is, the NFC terminal 300 may be replaced by other external terminal such as a CAT terminal or a POS terminal, according to a selected payment module. In this case, identification information related to a payment means (e.g., a QR code, a bar code, etc.) may be output to the display unit 151 such that a POS terminal may read information on the payment means corresponding to a selected payment module.

In an embodiment, while a payment or point saving is executed for NFC communication, the controller 180 may control the payment to be executed in a condition that a touch input applied to a touch region is maintained. In this case, if the touch input applied to the display unit 151 is released before the payment is completed, the connected state between the coils corresponding to the second payment module and the frequency matching circuit may be released. As a result, the payment may be stopped or cancelled.

For instance, referring to FIG. 3, in a deactivated state of the display unit 151, if a user touches a touch region matching a specific payment module, the controller 180 executes a payment by contacting a payment means corresponding to the specific payment module to the external terminal 300, or in a non-contact manner. With such a configuration, battery consumption is reduced since the display unit 151 maintains the deactivated state.

In another embodiment, if a touch input applied to a touch region is released, an image related to a payment means corresponding to a payment module connected to the controller 180 may be output to the display unit 151. The image is a representative image for recognizing a payment means, and may be a card image, etc. In the output state of the image, if the mobile terminal 100 approaches the external terminal 300, the controller 180 may execute a payment using a payment means corresponding to the output image.

With such a configuration, executing a payment using an erroneous (wrong) payment means may be prevented when a touch input is released, since a payment means corresponding to a payment module connected to the controller 180 can be viewed.

FIG. 4 is a flowchart illustrating an operation of the mobile terminal 100 according to the present invention.

Referring to FIG. 4, a touch input applied to the display unit 151 of the mobile terminal is sensed (S10). In this case, the display unit 151 is in a deactivated state, and the touch sensor provided at the display unit 151 is activated at preset periods for sensing of a touch input applied to the display unit 151 in a deactivated state of the display unit 151. Accordingly, the controller 180 may recognize various touch methods such as a touch region of a touch input applied to the display unit 151, a touch degree, a touch frequency (the number of times) and a touch time duration.

Next, a payment module matching a touch region of the touch input on the display unit 151, is selected (S20).

For this, as aforementioned, the mobile terminal 100 of the present invention may include a plurality of payment modules including one or more coils. And a size, a position and an arrangement state of a plurality of touch regions matching the plurality of payment modules, or a type of the plurality of payment modules matching a plurality of touch regions may be preset. In this case, a substantial position of coils corresponding to each payment module may not correspond to a position of a touch region matching each payment module.

In an embodiment, the controller 180 may output a specific image related to a selected payment module to the display unit 151, such that a user may check whether the selected payment module is correct or not. For this, at least one region of the display unit 151 may be converted into an activated state, and a specific image related to the selected payment module may be popped-up on the activated region of the display unit 151. The specific image may be a card image corresponding to the selected payment module, etc.

After the payment module is selected based on the touch input, if the mobile terminal 100 approaches the external terminal 300, a payment may be executed by using a payment means corresponding to the selected payment module (S30).

The number of the payment means corresponding to the selected payment module may be one or more. If the number of the payment means corresponding to the selected payment module is plural, the plurality of payment means may be sequentially applied such that a payment, point saving, etc. may be executed at a time. Alternatively, if the number of the payment means corresponding to the selected payment module is plural, a payment may be executed through an additional input by using a specific payment means.

As explained in the above embodiment, the mobile terminal 100 of the present invention may select one of a plurality of payment modules, based on a single touch input. With such a configuration, a user needs not execute a specific application or repeat inputs in order to select a specific payment module among a plurality of payment modules.

Further, as a user touches a specific region in a deactivated state of the display unit 151, a payment module matching the touched region is selected. This may allow battery consumption to be more reduced. Further, as a touch region matching a payment module is implemented through user customization, a customized service may be provided.

Hereinafter, various embodiments to select a payment method based on a touch region to which a touch input has been applied, in the mobile terminal according to the present invention will be explained in more detail, with reference to FIGS. 6A to 11.

Figure 5A:
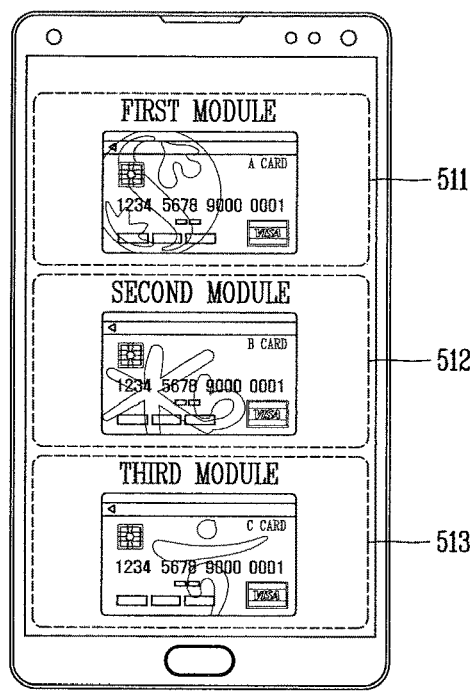
FIGS. 5A to 5C are views illustrating embodiments to select a payment means based on a touch input, in a mobile terminal according to the present invention.
Figure 5B:
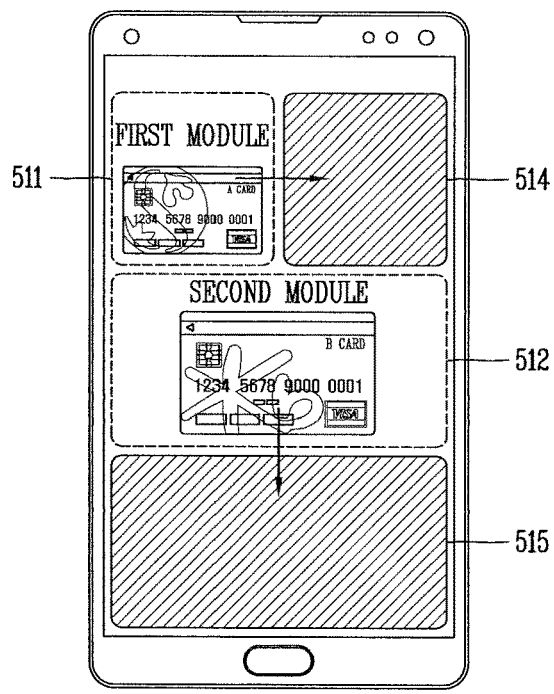
Figure 5C:
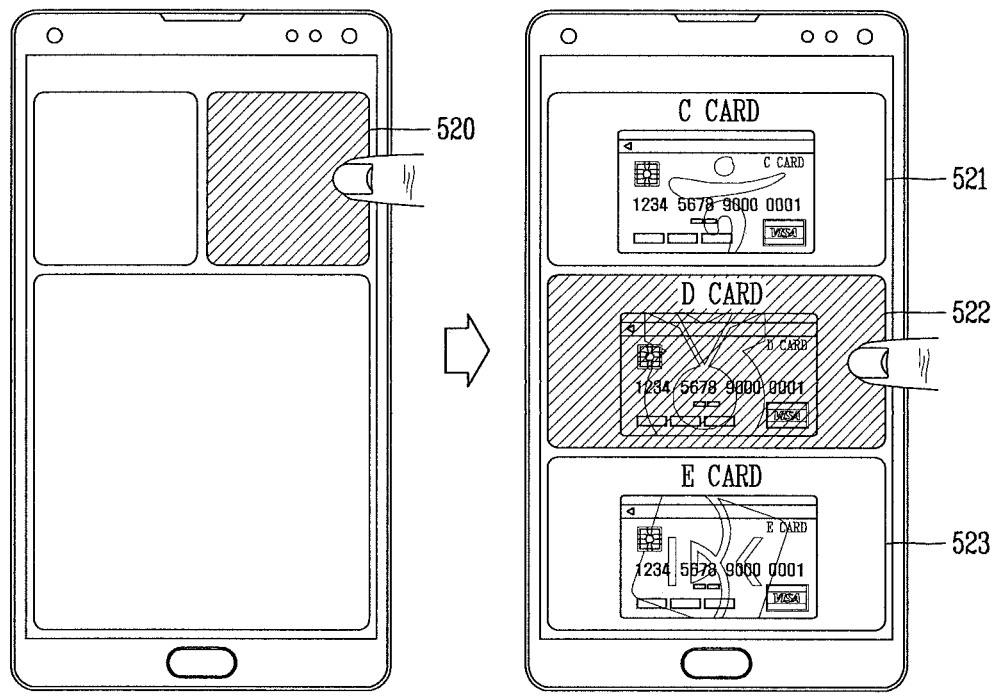

FIGS. 5A to 5C illustrate embodiments to set a touch region matching a payment means in a user customizing manner, and to select a payment means based on a touch input, in the mobile terminal 100 according to the present invention.

At least one of a position and a size of a plurality of touch regions matching a plurality of payment modules provided at the mobile terminal 100 of the present invention, may be set based on a user input. That is, a size, a position, the number, etc. of touch regions matching a plurality of payment modules may be customized by a user, irrespective of coil regions, etc. corresponding to the payment modules.

Referring to FIG. 5A, an upper region 511 of the display unit 151 may match a first payment module 210, a middle region 512 of the display unit 151 may match a second payment module 220, and a lower region 513 of the display unit 151 may match a third payment module 230. For instance, the first payment module 210 may correspond to an NFC antenna module operated in a read mode or a card mode, the second payment module 220 may correspond to an NFC antenna module operated in a P2P mode, and the third payment module 230 may correspond to an antenna module which executes a wireless payment function. Each of the payment modules may include one or more payment means.

If a touch input is applied to the upper region 511 of the display unit 151, the controller 180 connects coils corresponding to the first payment module 210 with a frequency matching circuit.

If a touch input is applied to an edge of a touch region matching each payment module, the controller 180 may ignore the touch input in order to prevent an erroneous selection or an erroneous payment, and may output notification information inducing a user's re-input, to the display unit 151. Such notification information may include a screen indicating a position and a size of each touch region matching each payment module.

FIGS. 5B and 5C illustrate embodiments of touch regions customized by a user and touch methods.

Referring to FIG. 5B, a touch region matching a single payment module may include a plurality of detailed regions. For instance, a touch region 511 corresponding to the first payment module 210 may include a left sub-region and a right sub-region 514. In this case, the controller 180 may match a specific condition to the sub-region 514.

Once a touch input is applied to one of the plurality of detailed regions, the controller 180 may detect a condition matching the one detailed region, and may connect the one payment module thereto in a relating manner to the detected condition.

The specific condition may be related to other payment means corresponding to the first payment module 511 (e.g., a specific payment means frequently used by a user).

Alternatively, the specific condition may correspond to a specific category (e.g., meals, traffic, etc.) sorted arbitrarily according to a user's life style.

For instance, if the right sub-region 514 is set as a traffic payment region, a user may apply a touch input to the right sub-region 514 in order to make the mobile terminal 100 approach the external terminal for a traffic payment using the first payment module. This may allow the user to check payment histories through a plurality of payment modules, by category.

The controller 180 may move a position of a touch region matching a single payment module based on a user's input. For instance, as shown in FIG. 5B, the controller 180 may move a touch region 512 matching the second payment module 220, to the lower region 515 from the middle region of the display unit 151.

Even after the touch regions are customized, the controller 180 may change a size, etc. of the touch regions based on a user pattern, e.g., based on a touch region to which a touch input is frequently applied.

As another example, as shown in FIG. 5C, the controller 180 may selectively connect one payment module thereto based on a touch region 520 to which a touch input has been firstly applied to the display unit 151. And the controller 180 may execute a payment by selecting a payment means corresponding to a touch region of a subsequent touch input.

If a specific payment module is connected to the controller 180 as a touch input is applied to a specific region of the display unit 151, the plurality of touch regions of the display unit 151 are reconfigured so as to correspond to the connected specific payment module. For instance, referring to FIG. 5C, if a touch input is applied to the upper right region 520 of the display unit 151, a corresponding payment module is connected to the controller 180. And the display unit 151 is reconfigured to have a first region 521, a second region 522 and a third region 523, based on a plurality of payment means (C card, D card and E card) corresponding to the connected payment module.

In this case, the first region 521, the second region 522 and the third region 523 may correspond to virtual regions implemented in a deactivated state of the display unit 151. That is, if a user is to execute an NFC payment using the D card, the user may apply a touch input to the upper right region 520 of the display unit 151 to select an NFC payment module. Then, the user may apply a subsequent touch input to the second region 522 to select the D card. In this case, the controller 180 may display an image related to the selected payment module on the display unit 151 when the first touch input is released.

Figure 6A:
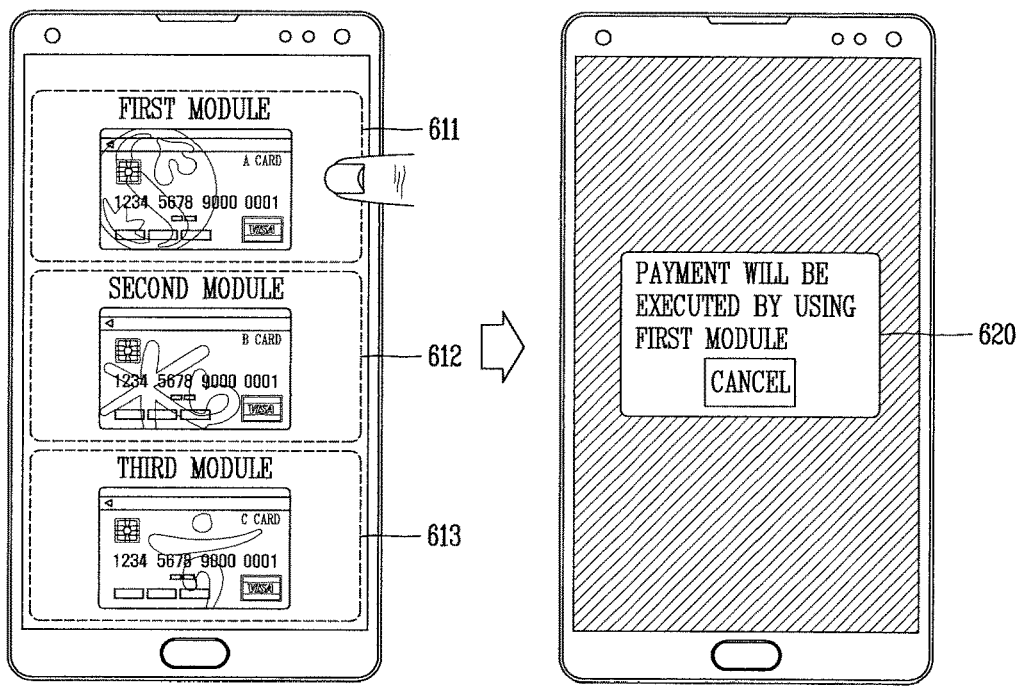

FIG. 6A illustrates an embodiment to inform a user of a payment module selected by a touch input, before a payment is substantially executed.

If one payment module is connected to the controller 180 based on a touch input applied to the display unit 151, and if an approaching state of the mobile terminal 100 to an external terminal is sensed, the controller 180 may firstly output guide information indicating a payment is being executed, using a payment means corresponding to the connected payment module. This may allow a user to visually check whether a correct payment module has been selected or not, before a payment is substantially executed.

For instance, referring to FIG. 6A, if a touch input is applied to a touch region 611 matching a first payment module, a region of the display region 151 (e.g., a middle region) may be activated to display a pop-up window 620 indicating that a payment is to be executed by using the first payment module.

Even if a touch input was applied to the touch region 611, if the mobile terminal 100 has not approached an external terminal for executing a payment (e.g., a POS terminal or an NFC terminal), the controller 180 may control the pop-up window 620 not to be displayed. This may prevent an unnecessary operation of the mobile terminal due to a user's unintentional touch input or a user's touch input for other purpose.

The controller 180 may a payment to be cancelled, based on a response to the guide information displayed on the pop-up window 620. That is, as a user applies a touch input to a cancel button of the pop-up window 620 before a payment is substantially completed, the controller 180 may cancel the payment using the first payment module.

In the case of payment cancellation, the controller 180 may output second guide information for inducing selection of other payment module. For instance, the controller 180 may convert at least part of the display unit 151 into an activated state, and then may display image objects. The image objects indicate identification information and boundaries among a first touch region 611 matching a first payment module, a second touch region 612 matching a second payment module, and a third touch region 613 matching a third payment module.

Figure 6B:
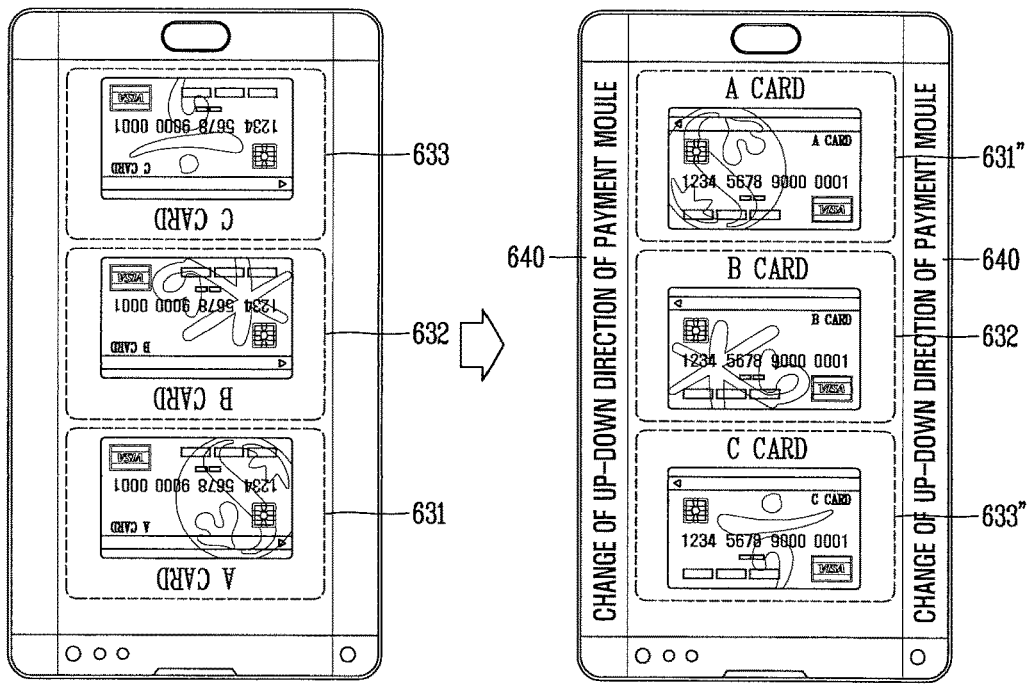

FIG. 6B illustrates an embodiment to change an arrangement state of touch regions matching a plurality of payment modules, in a vertical direction of the display unit 151.

When executing a payment by contacting the mobile terminal 100 to an external terminal (in a contacted manner) or by approaching the mobile terminal to the external terminal (in a contactless manner), a user may not check an up-down direction of the mobile terminal 100. For instance, if a user applies a touch input to a specific touch region while holding the mobile terminal 100 in an upside-down state, the specific touch region may not be an intended (desired) touch region of the user.

In order to solve such a problem, the mobile terminal 100 of the present invention may be provided with a sensor for sensing a change of an up-down direction of the mobile terminal based on a ground surface, e.g., a gyro sensor (and/or an acceleration sensor). And the controller 180 may activate the sensor when a first touch input is applied to the display unit 151.

Upon sensing of a change of an up-down direction of the mobile terminal 100 by the sensor, the controller 180 may ignore the first touch input. And the controller 180 may reconfigure an arrangement order of touch regions matching a plurality of payment modules, in correspondence to the changed up-down direction of the mobile terminal 100.

For instance, as shown in FIG. 6B, if a user applies a touch input to one of a plurality of touch regions 633, 632, 631 while holding the mobile terminal 100 in an upside-down state, the controller 180 may ignore the touch input. And the controller 180 may change the arrangement order of the touch regions in a reversed manner (631", 632, 633").

And the controller 180 may display guide information on one region of the display unit, the guide information indicating that the arrangement order of the touch regions matching a plurality of payment modules has been changed in correspondence to the changed up-down direction of the mobile terminal 100. FIG. 6B illustrates an embodiment to output such guide information to a side display region 640 of the mobile terminal 100. That is, if a user applies a touch input to a specific touch region while holding the mobile terminal 100 in an upside-down state, a payment module matching the specific touch region is not selected. Rather, a message which reads 'change of payment modules in an up-down direction' is output to the side display region 640 of the mobile terminal 100.

In another embodiment, if a user applies a touch input to one of the plurality of touch regions 633, 632, 631 while holding the mobile terminal 100 in an upside-down state, the controller 180 may maintain the arrangement order of the touch regions matching a plurality of payment modules. And the controller 180 may output information indicating the change of the up-down direction of the mobile terminal, to one region of the display unit 151.

Figure 7A:
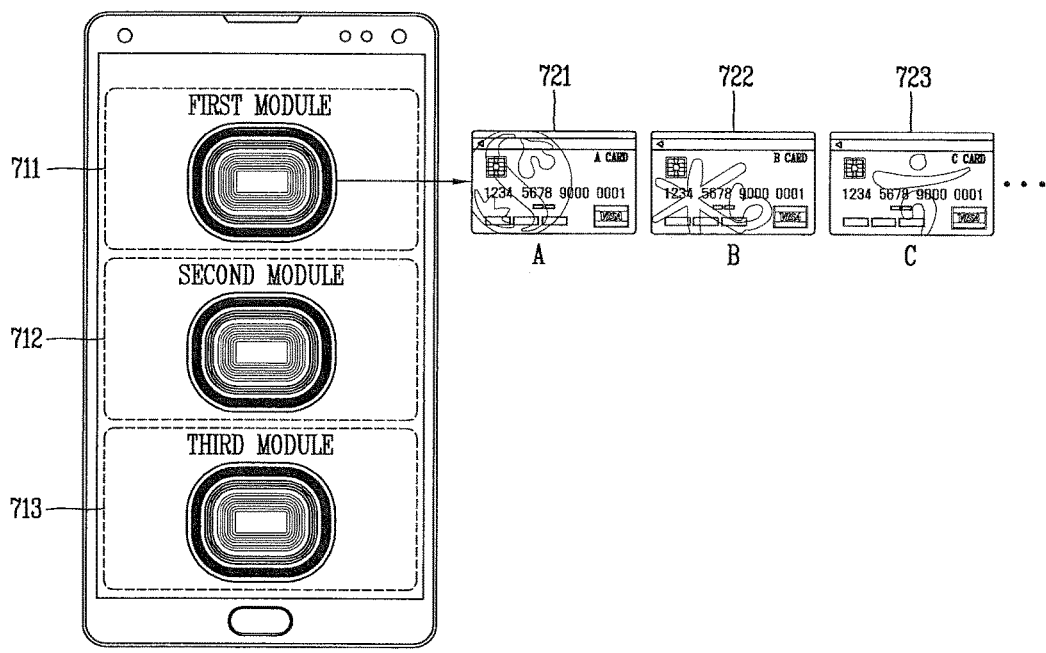
Figure 7B:
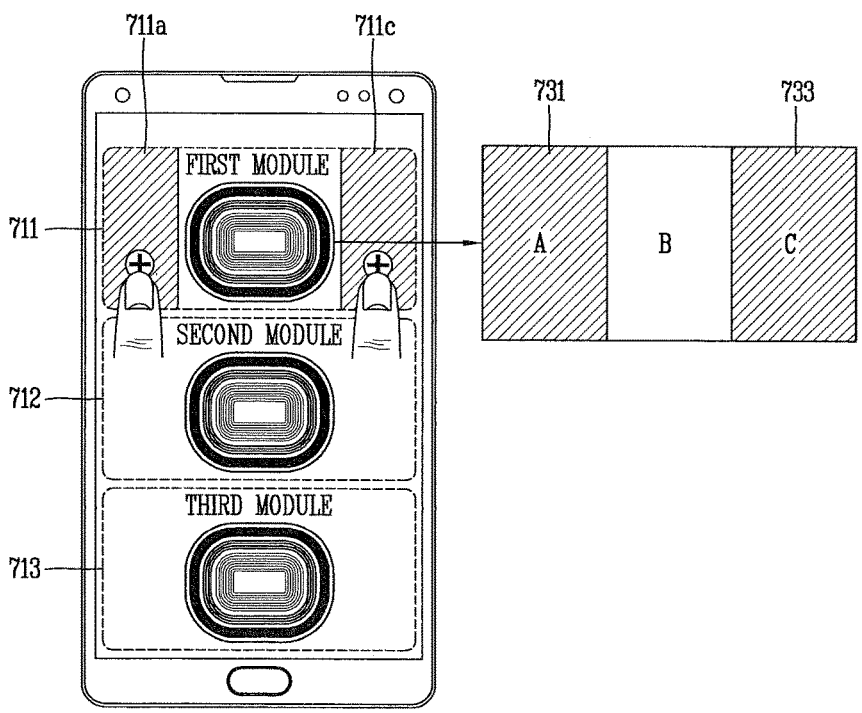

FIGS. 7A and 7B are views illustrating examples to differently determine a payment means corresponding to a payment module, based on a touch method applied to a touch region.

More specifically, the controller 180 may differently determine a payment means corresponding to a payment module connected thereto, based on at least one of a touch degree and a touch time duration of a touch input applied to a touch region.

For instance, referring to FIG. 7A, if a touch input is applied to a first region 711 in a deactivated state of the display unit 151, the controller 180 connects coils corresponding to a first payment module matching the first region 711, with a frequency matching circuit. In this case, the controller 180 may select a different payment means, based on a touch degree of the touch input applied to the first region 711. More specifically, the controller 180 may select a payment means by determining a touch degree based on a direct proportional relation between a pressure and a resistance of the touch input applied to the touch region, or based on an inverse proportional relation between a pressure and a resistance of the touch input applied to the touch region. For instance, in a case where a touch degree is determined based on a direct proportional relation between a pressure and a resistance of a touch input in FIG. 7A, A card 721 may be selected if a touch input is applied with a pressure less than a reference value, and B card 722 or C card 723 may be selected if a touch input is applied with a pressure more than the reference value. On the other hand, in a case where a touch degree is determined based on an inverse proportional relation between a pressure and a resistance of a touch input in FIG. 7A, the A card 721 may be selected if a touch input is applied with a pressure more than the reference value.

When a payment means is changed, an image object (e.g., number) indicating the change of the payment means may be output to the display unit 151. In this case, the image object may be displayed on a preset region of the display unit 151 by using a few pixels, for reduction of battery consumption.

In another embodiment, if a plurality of touch inputs are applied to a touch region, the controller 180 may simultaneously select a plurality of payment means corresponding to the plurality of touch inputs, among a plurality of payment means corresponding to a payment module connected thereto. For instance, referring to FIG. 7B, in a case where the first region 711 of the display unit 151 matches a first payment module, if a user simultaneously applies touch inputs to a left sub-region 711*a* and a right sub-region 711*c* of the first region 711, a plurality of payment means (A, C) 731, 733 corresponding to the first payment module are simultaneously selected. In this state, if the user approaches the mobile terminal 100 to the external terminal 300, the selected plurality of payment means (e.g., main card A, saving card C) are applied in payment order. With such a configuration, a user may easily select a desired single payment means or a plurality of payment means through a single touch input, even if there are a plurality of payments means corresponding to a selected payment module.

In a case where a selected payment module is implemented for a wireless payment method, a user authentication may be required for security.

FIG. 8 illustrates an example to select a payment module based on a touch input, and then to execute a user authentication.

More specifically, when a single payment module is connected to the controller 180 based on a touch input applied to the display unit 151, the controller 180 may activate a fingerprint recognition function as a user authentication means. In this case, the controller 180 may generate a fingerprint input region based on a touch point on the display unit 151 to which the touch input has been applied. That is, an activation region of the fingerprint recognition function may correspond to a touch point on the display unit 151 to which the touch input has been applied (i.e., a touch region). In this case, a user needs not move the current touch point for an additional fingerprint input. For instance, referring to FIG. 8, when a user applies a touch input to a touch region 811 matching a first payment module, the controller 180 is connected to coils corresponding to the first payment module and a frequency matching circuit. In this case, if the touch input is maintained without being released, a fingerprint authentication process is sequentially executed. As a result, a region of the display unit 151 is activated, and a pop-up window 820 indicating that the fingerprint authentication process is being executed is displayed.

In this case, an input region for inputting a fingerprint is displayed on the pop-up window 820. However, a fingerprint input to the pop-up window 820 may be replaced by a fingerprint recognition with respect to the touch input. That is, if the user maintains the touch input applied to the touch region 811, a fingerprint recognition sensor is activated on the corresponding touch point or touch region to execute a fingerprint recognition process.

Once the fingerprint recognition process is executed, the controller 180 may read a payment means corresponding to the single payment module connected thereto, based on a fingerprint recognition result. That is, the controller 180 is connected to a specific payment module based on a first touch input, and maintains a standby state. Then, upon completion of the user authentication, the controller 180 may terminate the standby state and may detect a corresponding payment means. In this case, notification information 830 indicating that the user authentication has been completed and a payment is executable, may be popped-up on one region of the display unit 151. Once the notification information 830 is popped-up, the user approaches the mobile terminal 100 to the external terminal 300 to execute a payment.

In the present invention, not only a desired payment module is selected, but also a user authentication is executed, through a single touch input. Accordingly, a user may execute a payment rapidly and safely, using the specific payment module.

Figure 9A:
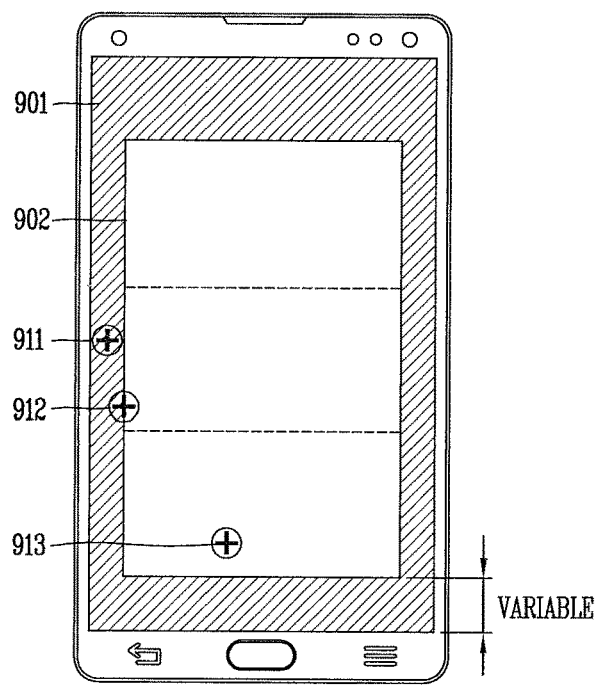
Figure 9B:
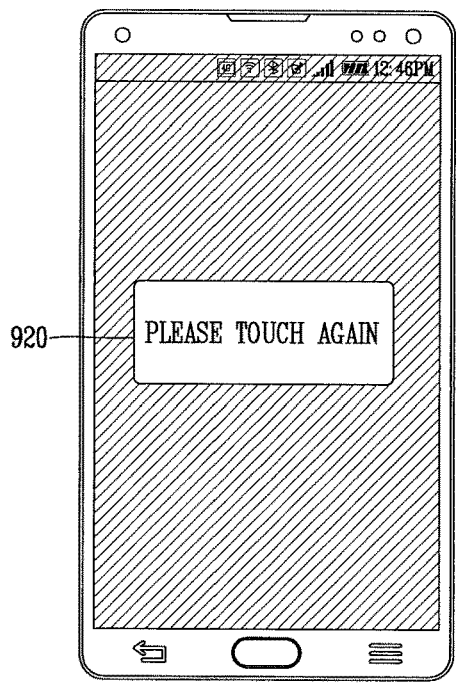
Figure 9C:
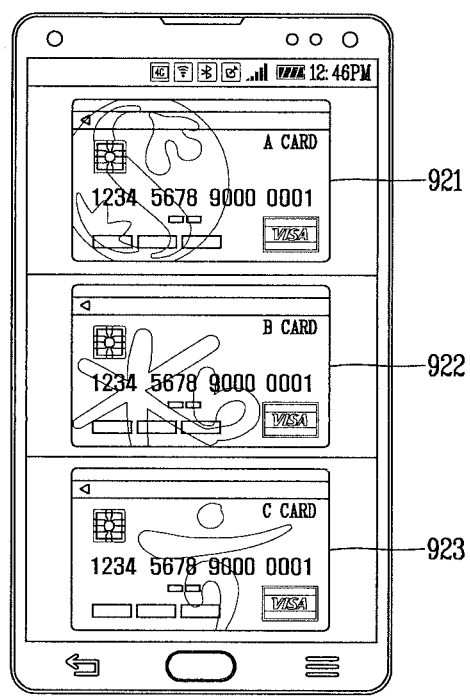

FIGS. 9A to 9C illustrate examples to set invalid touch regions, in order to prevent a user's unintentional selection when selecting a payment module by a touch input.

In the present invention, a payment module is selected as a touch input is applied to a specific region of the display unit 151 in a deactivated state (i.e., a standby state) of the display unit 151. This may allow battery consumption to be reduced, and allow a user to easily select a desired payment module.

If a touch input is applied to an edge region of the display unit 151 or boundary regions among touch regions, other payment module rather than a desired specific payment module may be selected. In order to solve such a problem, as aforementioned, an image related to a selected payment module may be displayed. Alternatively, invalid touch regions may be preset as follows.

For instance, referring to FIG. 9A, an edge region 901 of the display unit 151 may be set as an invalid touch region. In this case, each side of the edge region 901 may have its width variable. A boundary region 912 between the edge region 901 of the display unit 151 and an effective region may be also set as an invalid touch region, for prevention of a user's erroneous selection. Further, dotted lines among touch regions corresponding to different payment modules, which are inside the effective region shown in FIG. 9A, may be also set as an invalid touch region.

In this case, if a touch input is applied to the invalid touch regions (e.g., the edge region 901 of the display unit 151, the boundary region 912, and the dotted lines), the controller 180 may output information guiding effective (valid) touch regions matching a plurality of payment modules.

That is, as shown in FIG. 9B, first notification information 920 inducing a user's re-input may be displayed such that a touch input may be applied to the effective touch region (e.g., 913). Alternatively, as shown in FIG. 9C, the display unit 151 may be activated, and a screen may be displayed. In this case, the screen includes the effective touch regions matching a plurality of payment modules, and includes images 921, 922, 923 of payment means corresponding to the respective effective touch regions.

With such a configuration, a user may select a touch region matching a desired payment module more precisely, may prevent an undesired payment module from being selected, and may prevent occurrence of an erroneous payment using an undesired payment means.

In the present invention, a plurality of payment modules matching a plurality of touch regions may be variable based on a preset reference (basis) without a user input.

In an embodiment, the controller 180 may automatically change an arrangement state of touch regions corresponding to a plurality of payment modules, or may automatically change a payment module or a payment means matching a touch region.

For instance, as shown in FIG. 10, during a daytime, touch regions may be arranged based on payment modules or payment means A, B, C (1001, 1002, 1003) mainly used during a daytime. On the other hand, during a nighttime, the touch regions may be rearranged based on payment modules or payment means D, E (1004, 1005) mainly used during a nighttime. Although not shown, a day may be divided into a plurality of time regions, and an arrangement state of touch regions may be automatically changed based on a payment module or a payment means corresponding to each time region.

In another embodiment, the controller 180 may recognize a grip state of the mobile terminal 100 (left grip, right grip, vertical-direction grip, horizontal-direction grip, etc.) based on a touch input applied to an edge region of the display unit 151. And the controller 180 may change an arrangement state of touch regions matching a plurality of payment modules, based on the recognized grip state.

For instance, as shown in an upper drawing of FIG. 11, if the mobile terminal 100 is gripped by a user's right hand, touch regions matching a plurality of payment modules are arranged, based on a right region of the display unit 151. On the other hand, as shown in a lower drawing of FIG. 11, if the mobile terminal 100 is gripped by a user's left hand, touch regions matching a plurality of payment modules are arranged, based on a left region of the display unit 151. With such a configuration, a user may easily select a payment module to be connected to the controller 180 using his or her thumb, while maintaining the gripped state of the mobile terminal 100.

Although not shown, the controller 180 may change an arrangement state of touch regions matching a plurality of payment modules, based on position information of the body received by the location information module 115 provided at the body (e.g., a GPS, etc.). For instance, if the mobile terminal enters a preset first position, a touch region matching a payment module 'A' which has been used most frequently on the first position, may be changed in correspondence to a widest region on the display unit, or in correspondence to a region on the display unit to which touch inputs have been applied most frequently.

Although not shown, the controller 180 may require an additional input for connecting coils corresponding to a selected payment module to a frequency matching circuit. For instance, if a touch input applied to a specific region of the display unit 151 is flicked in a preset direction (e.g., a direction toward an outer side of the display unit 151), the controller 180 may be electrically connected to the selected payment module.

Further, even after a specific payment module was selected based on a touch input, if the mobile terminal 100 has not approached an external terminal yet or if a payment has not been completed yet, a touch input may be applied to another touch region of the display unit 151. As a result, a connected state of the existing selected specific payment module to the controller 180 may be released, and coils corresponding to a payment module corresponding to the another touch region may be connected to a frequency matching circuit. With such a configuration, a user may easily change a selected payment module.

As aforementioned, the mobile terminal according to an embodiment of the present invention may have the following advantages.

Firstly, one of a plurality of payment modules may be easily selected based on a single touch input. Accordingly, a user needs not execute a specific application or repeat inputs in order to select a specific payment module among a plurality of payment modules mounted in the mobile terminal.

Further, as a user touches a specific region in a deactivated state of the display unit 151, a payment module matching the touched region is selected. This may allow battery consumption to be more reduced. Further, as a touch region matching a payment module is implemented through user customization, a customized service may be provided.

Further, not only a desired payment module is selected, but also a user authentication is executed, through a touch input applied to a specific region of the display unit. Accordingly, a user may execute a mobile payment rapidly and safely.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a display that includes a touch sensor and one or more touch regions;
   one or more payment modules, each of the one or more payment modules including one or more coils; and
   a hardware controller that is configured to:
      set a positon of each of the one or more touch regions matching each of the one or more payment modules based on a user's input,
      in a state in which the display is deactivated and the touch sensor is activated, identify a first touch region from the one or more touch regions, wherein the first touch region is a touch region where touch input is applied,
      determine a first payment module, from the one or more payment modules, that matches the first touch region, and
      connect first coils among the one or more coils corresponding to the first payment module with a frequency matching circuit based on the determination of the first payment module.

2. The mobile terminal of claim 1, wherein the hardware controller is further configured to:
   obtain a distance between the mobile terminal and an external terminal, and
   process, based on the distance between the mobile terminal and the external terminal, a payment transaction with a first payment account that is associated with the first payment module.

3. The mobile terminal of claim 2, wherein the hardware controller is further configured to:
   determine whether the touch input applied to the first touch region is being maintained, and
   stop, based on a determination that the touch input applied to the touch region is being maintained, the payment transaction.

4. The mobile terminal of claim 1, wherein the hardware controller is further configured to:
   obtain a distance between the mobile terminal and an external terminal,
   determine whether the touch input applied to the touch region is released,
   provide, to the display, an image that is associated with a first payment account, and
   process, based on (i) the distance between the mobile terminal and the external terminal and (ii) the determination that the touch input applied to the touch region is released, a payment transaction with the first payment account that is associated with the image.

5. The mobile terminal of claim 1, wherein a size, position, or shape of each touch region is adjustable.

6. The mobile terminal of claim 1, wherein the one or more touch regions includes a second touch region that is different than the first touch region, the second touch region including a plurality of sub-regions, each sub-region being associated with a specific category of payment transaction, and
   wherein the hardware controller is configured to:
      identify a second sub-region, from the plurality of sub-regions, that is a sub-region where second touch input is applied,
      obtain a second category of payment transaction that is associated with the second sub-region,
      determine a second payment module, from the one or more payment modules, that corresponds to the second sub-region, the second payment module being different than the first payment module, and
      connect to the second payment module for a payment transaction that is in the second category of payment transaction.

7. The mobile terminal of claim 1, wherein the first payment module is associated with a plurality of payment accounts and the hardware controller is configured to:
   provide, in response to the touch input applied to the first touch region, a plurality of additional touch regions to the display, wherein each of the plurality of additional touch regions is associated with one of the plurality of payment accounts, identify a second touch region from the plurality of additional touch regions, wherein the second touch region is a touch region where second touch input is applied, and process a payment transaction with a second payment account that is associated with the second touch region.

8. The mobile terminal of claim 1, wherein the hardware controller is configured to:

obtain a distance between the mobile terminal and an external terminal, and provide, based on the distance between the mobile terminal and the external terminal, guide information indicating that a payment transaction is set to be processed with a first payment account that is associated with the first payment module.

9. The mobile terminal of claim 1, further comprising a sensor configured to sense tilt of the display, wherein the hardware controller is configured to adjust, based on the tilt of the display, an arrangement of the one or more touch regions.

10. The mobile terminal of claim 9, wherein the hardware controller is further configured to provide, to the display, guide information indicating the adjustment of the arrangement of the one or more touch regions.

11. The mobile terminal of claim 1, wherein the first payment module is associated with a plurality of payment accounts and the hardware controller is further configured to:

obtain touch sensitivity or touch time duration of the touch input, determine, based on the touch sensitivity or the touch time duration of the touch input, a first payment account from the plurality of payment accounts, and process a payment transaction with the first payment account.

12. The mobile terminal of claim 1, wherein the first payment module is associated with a plurality of payment accounts and the hardware controller is further configured to:

identify a plurality of second touch regions that are touch regions where a plurality of second touch inputs are applied, and determine one or more payment accounts, from the plurality of payment accounts, that are associated with the plurality of second touch regions.

13. The mobile terminal of claim 1, wherein the hardware controller is further configured to:

receive fingerprint information from a user, and determine, based on the fingerprint information, a first payment account that is associated with the first payment module.

14. The mobile terminal of claim 1, wherein the hardware controller is further configured to:

determine whether the touch input is applied within a first distance from boundaries of the first touch region, and provide, to the display and based on the determination that the touch input is applied within the first distance from the boundaries of the first touch region, a notification indicating that the touch input is not valid.

15. The mobile terminal of claim 1, wherein the hardware controller is configured to adjust, based on time information, an arrangement of the one or more touch regions.

16. The mobile terminal of claim 1, wherein the hardware controller is configured to:

identify edge touch input that is applied to edge areas of the display, determine, based on the edge touch input, a grip state and a grip position of the mobile terminal, and adjust, based on the grip state and the grip position, an arrangement of the one or more touch regions.

17. The mobile terminal of claim 1, further comprising:

a case including the display that is mounted on a first surface of the case; and a battery that is mounted in the case and that is disposed on a second surface of the case, wherein the one or more payment modules are disposed between the case and the battery.

18. The mobile terminal of claim 1, wherein each of the one or more touch regions is mapped to one of the one or more payment modules.

19. The mobile terminal of claim 10, wherein the hardware controller is configured to:

receive user input in response to the guide information, and stop the payment transaction based on the user input.

20. The mobile terminal of claim 1, wherein the hardware controller is further configured to:

obtain user location information, and adjust, based on the user location information, an arrangement of the one or more touch regions.

* * * * *